June 3, 1930.   J. ROBINSON   1,761,845
AUTOMATIC TRAIN PIPE CONNECTER
Original Filed Feb. 20, 1922   2 Sheets-Sheet 1
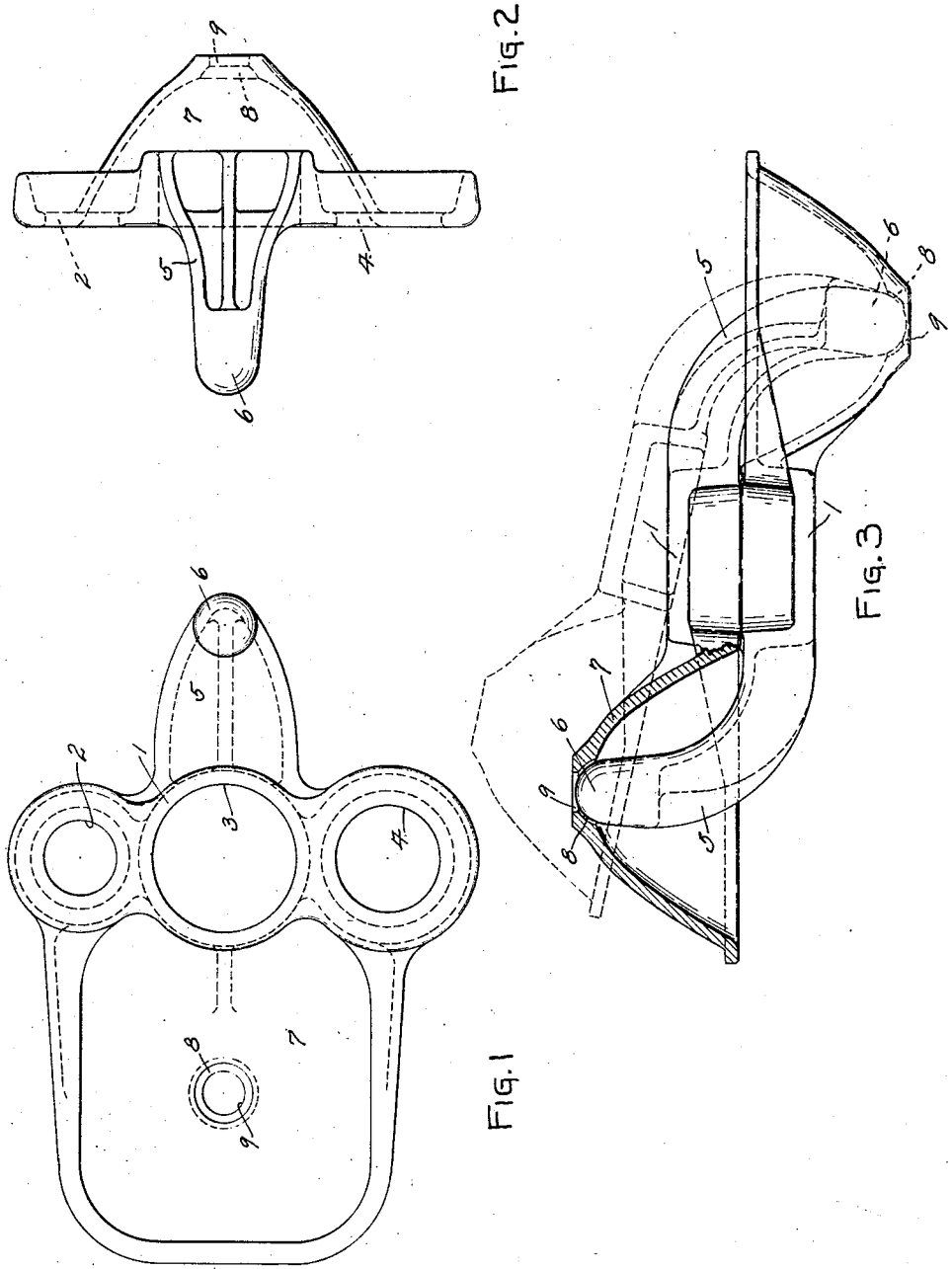
INVENTOR
Joseph Robinson
BY
ATTORNEY June 3, 1930.  J. ROBINSON  1,761,845
AUTOMATIC TRAIN PIPE CONNECTER
Original Filed Feb. 20, 1922   2 Sheets-Sheet 2

INVENTOR
Joseph Robinson
BY
ATTORNEY

Patented June 3, 1930

1,761,845

UNITED STATES PATENT OFFICE

JOSEPH ROBINSON, OF NEW YORK, N. Y.

AUTOMATIC TRAIN-PIPE CONNECTER

Application filed February 20, 1922, Serial No. 537,827. Renewed May 3, 1929.

My invention has relation to train pipe coupling mechanisms known as "Robinson connecters", and particularly to the pin and funnel type of such connecters.

An inherent advantage of the pin and funnel class of connecters is the assurance of accurate alinement of the fluid ports to be connected; my present improvements deal primarily with the problem of materially increasing the effective gathering or coupling range of mating connecter members, and reduction of possibility of coupling failure. The natural or obvious expedient available, by which to obtain a greater coupling range for connecters of the class referred to, is to enlarge the funnel member of the device to give it a correspondingly increased gathering area. But this expedient leads to difficulties. In the first place there is always a limit to the size of an appliance of the character of my invention, having in view considerations of mounting of the device upon the cars, interferences with other car equipment, phases of commercial manufacture, and working efficiency. The larger the device the more cumbersome and less responsive is it to automatic pre-adjustment, and final effective connection, which are absolute pre-requisites in the field of my present endeavors.

In certain of my previous known constructions in this art, exemplified by my Letters Patent 1,245,784, issued November 6, 1917, and in my application Serial No. 508,583, filed October 18, 1921, now Patent Number 1,677,902, granted July 24, 1928, I have utilized a type of connecter in which the pin and funnel elements interlock quite effectively. But my interlocking method tends to reduce the coupling range owing to the necessary elongation of the pin element by which the interlock is established, and my study of the operation of connecters shows that, given a fixed gathering range or area for the funnel, the longer the pin the less the co-operative coupling range. To shorten the pin may or may not increase the gathering range, and efficiency, dependent upon a very essential factor of construction, i. e., the formation of the funnel member. Liability of coupling failure may be a very present evil if the pin is capable of butting a funnel member surface which is presented square against the same, or, in other words, if the surface of the funnel member is perpendicular to direction of movement of the pin. I have especially designed my connecter to avoid this possibility, and though I avail myself of the fore-shortened pin construction, without increasing the superficial gathering area of my funnel member, I have nevertheless secured an operative coupling range approximately twenty-five percent greater than before.

In carrying out my invention to the above ends, I have peculiarly curved the walls of my funnel member, instead of forming them with a deep angle, something heretofore rather compelled by the length of the pin member. In shaping the funnel walls, moreover, I have utilized the principle of variably pitched curvature, the pitch of curvature nearer the mouth of the funnel being steep from the abutment faces of the coupling member, and of less pitch as it approaches the pin bearing centre of the funnel member. Or this curvature may be characterized as slight in its angle to the longitudinal axis or apex of the funnel member, more remote therefrom, becoming deeper or more abrupt as it nears said axis or apex. A cup-shaped funnel member is thus obtained.

In its practical embodiment I provide for my coupling members shallow abutment and bearing seats at the apices of the funnel members for receiving rounded heads or noses of the pins instead of employing interlocking seats, as I have used previously. In this way I obtain an increased lateral bearing for co-acting coupling members, one which corresponds in length to the distance between the bearing points of the pin members, and which, together with the extended vertical dimensions of said members, affords a rigidity of operating contact between the connecter heads, of surprising efficiency not heretofore attained, all of which will be fully explained hereinafter.

My funnel wall curvature as above set forth, and pin bearing seat formation, have advantages from the standpoint of preventing collection and holding of foreign matter on said parts liable to interfere with proper coupling, as later will become apparent. Likewise, the bearing seat formation obviates possibility of "sticking" connections between the members going together, or separating, as the case may be.

There are other specific features of construction and phases of advantageous operation of my connecter members which will appear more fully upon reference to the following detailed description, when studied in connection with the annexed drawings, in which:

Figure 1 is a front view of one of the heads of my connecter.

Figure 2 is a side view of the same.

Figure 3 is a top plan view of two engaged mating heads, the funnel member of one partly in section, and certain dotted lines illustrating how the nose of a pin member of one head may find its way into the center seat of a co-acting funnel member, the latter then becoming a fulcrum point about which the heads rock to final engagement.

Figure 4:
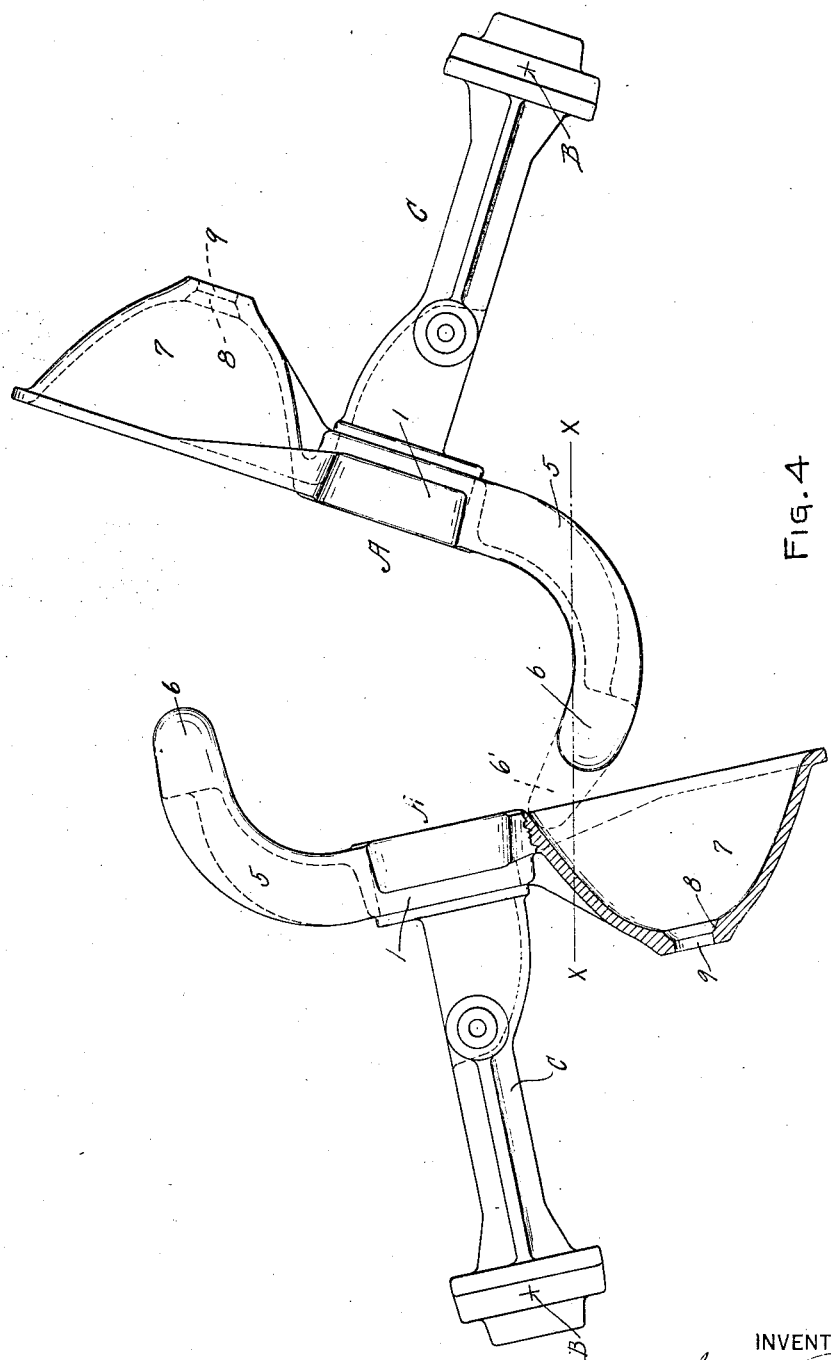

Figure 4 is a top plan view, with certain portions shown in section, and supporting parts illustrated somewhat diagrammatically, of mating connecter heads or members depicted in the act of going together, as in an actual coupling operation, the dotted lines at one of the pin members indicating where a relatively long pin member would engage the funnel member, while the point of intersection of the line X—X shows the point where my "fore-shortened" pin member will engage when the heads come together.

Referring to Figure 4 of my drawings, it is noted that I have illustrated diagrammatically certain supporting parts for the coupling heads A of my connecter, the said supporting parts usually comprise a bracket having a universal mounting connection at B with rearwardly extending portions C of the coupling heads, which portions support a coiled spring or some equivalent means for resiliently or yieldingly holding the coupling heads A in place. I have illustrated the heads A in detail because it is primarily with respect to their peculiar specific construction that my invention has to do. For methods of specific mounting of my connecter heads upon the cars by which they would be supported, I refer to the patent and application hereinbefore identified, and to the general list of my prior patents as found in this art.

In the drawings my head is shown to comprise the central body 1, which is elongated vertically to provide for the construction of the several ports 2, 3, and 4, the functions of which are well known. Laterally each head A is built to provide a pin member 5 having the rounded nose or head 6 and curving forwardly from the body portion 1 aforesaid. On the opposite side of the body, the head A has the funnel member 7 which is of the peculiar construction roughly outlined heretofore and now to be detailed. This funnel member has its walls curving from the mouth or open base thereof inwardly to a special seat 8 located at the apex or centre of the funnel member, at which the member is formed with the opening 9. For a considerable distance from the mouth or large open end thereof, the funnel member has its inner walls curved steeply inwards but at a relatively slight angle in respect to the longitudinal axis of the head 6 of the pin member 5. As the curvature of the walls approaches the seat 8 is will be apparent that said curvature becomes more abrupt, or assumes greater angularity in reference to the apex or centre of the member, in fact where said curvature merges into that of the seat 8, the walls might be said to extend almost at a right angle to the funnel members axis, or to the head 6 of the pin member 5 when said end is received in the seat.

In practice, the peculiar curvature of the funnel member walls accommodates for a special operation of the pin member 5, in conjunction with the funnel member, which goes to the very crux of my present invention. In the first place, owing to the relatively steep pitch of the curvature of the inner walls of the member 7, when the coupling heads come together an easy sliding contact is obtained between the head 6 of the pin member 5 and the funnel member 7 with which it mates. This action is somewhat illustrated in Figure 1 of the drawings. This easy sliding is highly desirable, and even necessary under certain conditions of operation, as when the coupling heads are brought together at wire angles in the manner of the illustration of Figure 1. At the time of the first engagement between the parts 6 and 7, and for a short period thereafter, there is liability of coupling failure in ordinary types of couplers, which is obviated owing to the construction that I employ. It is apparent that if the pin member 5 meets squarely the wall portion of a funnel member, in such a way that a free relative sliding of the two thereafter is not obtainable to bring the coupling heads toward their centering, abutting positions, a coupling failure will result. My construction affords easy sliding initial contact of the pin member 5 with the funnel member 7, and a little later in the movement, as the pin member approaches the centre seat 8 in which it must be received on completion of the coupling action, the relative sliding of the parts aforesaid upon one another becomes less free or more sluggish, owing to the greater angularity of the curvature of the walls of the funnel member toward the apex thereof. However, this sluggish contact, as it may be characterized, is not harmful so far as obtaining effective results in coupling is concerned. By the time that the free sliding movement between the parts 5, 6 and 7 is reduced as suggested above, the heads A have become sufficiently adjusted or moved toward their alined positions, that there is no possibility of a coupling failure.

Reverting again to Figure 4, an appreciation of the increased gathering range of my pin and funnel construction of heads may be gained. It will be evident that if the coupling heads A were approaching one another toward the positions which they have assumed in Figure 4, and the pin member 5 were as long as depicted in dotted lines at 6', it would tend to enter the mouth of the funnel nearer to the contacting or butting face of the body 1 of the head A at the left. In fact, if the pin member 5 were much longer, the extreme angle at which the coupling heads are disposed owing to track curvature or some other predisposition of the heads, is such that there might be considerable liability of a face-on abutment between the funnel member wall and the nose of the pin member 5, or entire missing of the funnel such that the member 5 would be prevented from entering the funnel member by free sliding action, and a coupling failure would be the result. Therefore, the foreshortening of the pin member 5 necessarily tends to increase the gathering range of the funnel member and my method of curvature of the walls of the latter insures an easy centering of the pin member 5 in the funnel member to bring the heads A to proper alinement. As shown in Figure 3, to such an extent as is possible, the nose or head 6 of the pin member 5 when received fully by the seat 8 has a slight clearance respecting the seat in order to make sure that the parts 6 and 7 when co-operating, in no way interfere with complete and operating engagement between the bodies 1 of the heads A. The seat 8 is of course very shallow and is rounded to conform with the shape of the head or nose 6, such shallowness of the seat and the peculiar curvature of the funnel walls 7 tending to keep the said portions of the heads free of foreign substances which would have a tendency to lodge thereon otherwise. The extremity or nose of the pin member 5, designated 6, has a somewhat ball-like formation in its rounded shape and this greatly facilitates the sliding centering action of the pin on the funnel member, and while preventing interlocking, affords an excellent bearing, while at the same time eliminating possibility of sticking which may accompany use of interlocking parts of the class described.

With the coupling heads A together, the pin members 5 engaging the seats 8 provide a very broad lateral bearing for the heads, and the vertical extended portions of the body 1 equipped with the ports 2, 3, and 4, provide a corresponding bearing vertically of the engaged parts of the heads, all of which tends to make for a maximum efficiency respecting the rigid contact which is required between the coupling faces of the heads in an appliance of the character of my invention. The broad lateral bearing to which I have referred is especially advantageous because the whipping movement of running cars, by which the heads tend to rock one on the other, is absorbed at the universal joints B when a rigid contact between the meeting faces of the heads is maintained, something which my construction insures. To a large extent the vertical dimensions of my head provide a broad vertical bearing affording such broad operating contact between the heads in a vertical direction as to counteract tendencies of the heads to rock upon one another in such direction.

Figure 3 of my drawings forcibly presents the peculiar advantageous co-operation of the fore-shortened pin members with the seats 8 of the shallow funnel members. According to the full lines of this view, the connecter heads have come together into full engagement. However, the dotted lines show one of the heads having the ball nose 6 of one of its pin members 5 received by the socket 8 whilst the funnel member of this particular head is far from complete engagement with its co-acting pin member. In other words, according to the dotted and full line arrangements of the heads, they are at a considerable angle to one another in respect to their butting faces. It is under these circumstances that an important action of the two heads takes place, because instead of arriving at a gradual alinement until the longitudinal axis of one head is coincident with the corresponding axis of the other, to the time of final seating, the operation is as follows: The ball nose 6 of the pin member 5 promptly finds its centered engagement in the seat 8 of the funnel member at the right, as shown in Figure 3. Thereupon the seat 8 practically becomes a fulcrum point about which the heads rock until they arrive at their final butting relation, in which the noses 6 of both pin members 5 are seated in both seats 8 of the funnel members. I have found in practice that this action of coupling as I have described it in respect to Figure 3, takes place most usually on curves, involves a snapping together coupling movement in the final coupling action as distinguished from the gradual alining to which I have referred above in regard to certain types of connecters.

In respect to the funnel members, I use herein the term wall curvature in a somewhat relative sense, fully recognizing that to a certain extent the inner wall formation of my funnel members may involve an almost straight inner surface flare, if not one which is practically straight, but which ultimately must curve to the greater angle in respect to the axis of the funnel member, if a centering function is to be derived.

One acquainted in the art to which my improvements appertain will perceive other advantages of the construction which I have thus far described, and I do not wish to be limited to the exact formation of parts as illustrated, save as required by the spirit and scope of my invention as set forth in the accompanying claims.

I am aware of the Turner et al. Patent 1,219,055 issued March 13, 1917, and do not claim anything disclosed in said patent. My invention involves a true funnel-like structure as so known in the art and one in which said structure has a gathering area a number of times greater than the cross sectional area of the pin member which it is adapted to receive.

Having thus described my invention what I claim as new, is:

1. In an automatic connecter of the class described, the combination of mating coupling heads, each having a pin member cooperative with a receiving funnel member therefor, the funnel members having a gathering area much greater than the cross section of the largest portion of the pin member, the pin member being relatively short in its formation, and the funnel member comprising a relatively shallow body the inner walls of which have a variable curvature permitting free sliding movement of the pin member thereon when said pin member engages the funnel member near the mouth of the latter, the curvature of the funnel member being steep adjacent to the mouth thereof and in relation to its longitudinal axis and then becoming more abrupt as said curvature approaches said axis.

2. In an automatic connecter of the class described, the combination of mating coupling heads, each having a pin member cooperative with a receiving funnel member therefor, the funnel members having a gathering area much greater than the cross section of the largest portion of the pin member, the pin member being relatively short in its formation and the funnel member comprising a relatively shallow body the inner walls of which have a variable curvature permitting free sliding movement of the pin member thereon when said pin member engages the funnel member near the mouth of the latter, the curvature of the funnel member being steep adjacent to the mouth thereof and in relation to its longitudinal axis and then becoming more abrupt as said curvature approaches said axis, and a seat located adjacent to the apex or longitudinal axis of the funnel member for the final centering action of the pin member.

3. In an automatic connecter of the class described, the combination of mating coupling heads, each having a pin member cooperative with a receiving funnel member therefor, the funnel members having a gathering area much greater than the cross section of the largest portion of the pin member, the pin member being relatively short in its formation, and the funnel member comprising a relatively shallow body the inner walls of which have a variable curvature permitting free sliding movement of the pin member thereon when said pin member engages the funnel member near the mouth of the latter, the pin member being formed with a rounded ball like nose or head for direct engagement with the funnel member.

4. In an automatic connecter of the class described, the combination of mating coupling heads, each having a pin member cooperative with a receiving funnel member therefor, the pin member being relatively short in its formation, and the funnel member having a seat and comprising a relatively shallow body the inner walls of which have a variable curvature permitting free sliding movement of the pin member thereon when said pin member engages the funnel member near the mouth of the latter, and the pin member being formed with a round nose or head to contact with the inner walls of the funnel member and to finally be received in the seat aforesaid, there being provided a slight clearance between the said nose or head and the walls of said seat permitting firm and rigid engagement of the coupling faces of the heads.

5. In an automatic connecter of the class described, the combination of mating coupling heads, each comprising a pin and funnel member, the pin member being formed with a round nose or head to engage the inner walls of the funnel member and slide thereover, and the funnel member being formed with a seat at its base or longitudinal axis to receive and centre the head of the mating pin member, there being provided between the seat and the head parts aforesaid, a slight clearance to enable the coupling faces of the heads to assume and maintain rigid contact.

6. In an automatic connecter of the class described, the combination of mating coupling heads, each comprising a pin and funnel member, the pin member being formed with a round nose or head to engage the inner walls of the funnel member and slide thereover, and the funnel member being formed with a seat at its base or longitudinal axis to receive and centre the head of the mating pin member, there being provided between the seat and the head parts aforesaid, a slight clearance to enable the coupling faces of the heads to assume and maintain rigid contact, the seat aforesaid being shallow and merging into abrupt inner wall formation of the funnel member, whereby lodgment of foreign matter upon the said portions of the funnel member is rendered unlikely.

7. In an automatic connecter of the class described, the combination of mating coupling heads, each comprising a pin and funnel member, the pin member being formed with a round nose or head to engage the inner walls of the funnel member and slide thereover, and the funnel member being formed with a seat at its base or longitudinal axis to receive and centre the head of the mating pin member, there being provided between the seat and the head parts aforesaid, a slight clearance to enable the coupling faces of the heads to assume and maintain rigid contact, the seat aforesaid being shallow and merging into abrupt inner wall formation of the funnel member, whereby lodgment of foreign matter upon the said portions of the funnel member is rendered unlikely, the funnel member being provided with an opening at its apex portion, which opening merges into the seat and wall formation aforesaid.

8. In an automatic connecter of the class described, the combination of coupling heads, each comprising pin and funnel members, the pin member of one head to mate with the funnel member of the other head, and each head having a body of extended dimensions disposed substantially at a right angle to and centrally respecting the adjacent pin and funnel members, the funnel members of the heads being provided with shallow bearing seats near their apex portions, and the pin members of the heads being formed with round nosed extremities to slide in the funnel members and centre in a non-interlocking manner on said seats, the co-operation of the bearing seats and pin members affording a broad lateral bearing for the heads, upon one another in one direction, and the extended dimensions of the bodies of the heads forming also a broad bearing between the heads, in a direction transverse to that of the first mentioned broad bearing.

9. As a new article of manufacture, a coupling head for automatic connecters comprising pin and funnel members, the pin member being formed with a round nosed entering head for a mating funnel member and the funnel member being formed at its apex portion with an internal bearing seat of shallow dimensions, the pin member being relatively short and the funnel member being relatively shallow, and the inner walls of the funnel member being formed upon a variable curvature, relatively steep as it leads from the mouth of the funnel member and then becoming less steep as it extends laterally of the apex of said member substantially as described.

10. In an automatic connecter of the class described, the combination of mating coupling heads, each having a pin member co-operative with a receiving funnel member therefor, the pin member being relatively short in its formation, and the funnel member comprising a relatively shallow body, the inner walls of which have a variable curvature permitting free sliding movement of the pin member thereon when said pin member engages the funnel member near the mouth of the latter, and there being a seat at the end of the funnel member opposite the mouth, and the pin member being formed with a round nose or head to contact with the inner walls of the funnel member and to finally be received in the seat aforesaid.

11. In an automatic train pipe connecter, the combination of a pair of coupling heads each having a vertically disposed perforated coupling face lying in a plane at a right angle to the longitudinal axis of said connecter and adapted to make a butt joint with a companion head, each of said coupling heads being provided on one side of its coupling face with a forwardly extending pin and on the opposite side of said coupling face with a rearwardly extending funnel having a shallow bearing at its apex into which bearing said pin is adapted to pivotally seat to cause said heads to rock into final engagement with said bearing as their pivotal point, when said connecters couple up on a curve.

12. In a automatic train pipe connecter, the combination of co-acting coupling heads, combined with supporting means enabling universal movement of said heads in arriving at butting relations, each head comprising pin and funnel members for co-operation with funnel and pin members respectively of a mating head, and the pin members being short while the funnel members are shallow to receive them, each funnel member being provided with a centering bearing seat for a bearing extremity of a co-acting pin member, and on which bearing seat the pin member is adapted to rock as a fulcrum point to thereby cause relative quick rocking together of the connecter heads substantially as described.

JOSEPH ROBINSON.